United States Patent [19]

Tsutsui

[11] Patent Number: 4,900,908
[45] Date of Patent: Feb. 13, 1990

[54] CARD ACCESSING APPARATUS HAVING A HEAD DISPOSED UNDER A CARD FEEDING STAGE

[75] Inventor: Keiichi Tsutsui, Ibaraki, Japan

[73] Assignee: Omron Tateisi Electronics Co., Ltd., Kyoto, Japan

[21] Appl. No.: 342,674

[22] Filed: Apr. 26, 1989

Related U.S. Application Data

[63] Continuation-in-part of Ser. No. 76,500, Jul. 22, 1987, abandoned.

[30] Foreign Application Priority Data

Jul. 25, 1986 [JP] Japan ................................ 61-176442

[51] Int. Cl.⁴ ............................................. G11B 25/04
[52] U.S. Cl. ..................................... 235/475; 235/479; 360/2
[58] Field of Search ............... 235/475, 479, 480, 486; 360/2; 369/48

[56] References Cited

U.S. PATENT DOCUMENTS 4,141,044  2/1979  Kistner et al. ........................ 235/475
4,492,855  1/1985  Garczynski et al. ................. 235/486

FOREIGN PATENT DOCUMENTS 230275    7/1987  European Pat. Off. ............ 235/479
3616570  11/1986  Fed. Rep. of Germany .......... 360/2
80885     4/1987  Japan ..................................... 360/2
80886     4/1987  Japan ..................................... 360/2

OTHER PUBLICATIONS

Lynott et al., "Transport for Optical Mark-Sense Scanner," IBM Tech. Discl. Bul., vol. 12, No. 3, pp. 408, 409, Aug. 1969.

Primary Examiner—William H. Beha, Jr.
Attorney, Agent, or Firm—Stevens, Davis, Miller & Mosher

[57] ABSTRACT

A card accessing apparatus is provided which includes a stage unit for supporting a data storage card with a data storage area of the card facing downwardly, a housing including a bottom plate, for housing the stage unit, and a stage feeding unit supported on the bottom plate for reciprocating the stage unit. A read/write head is disposed under the stage unit, to read and write data on the data storage area of the card. A head feeding unit is supported on the bottom plate to drive the head unit to a position under the stage unit to access the data storage area of the card.

11 Claims, 11 Drawing Sheets

CARD ACCESSING APPARATUS HAVING A HEAD DISPOSED UNDER A CARD FEEDING STAGE

This application is a continuation-in-part of application Ser. No. 076,500, filed July 22, 1987, now abandoned.

FIELD OF THE INVENTION

This invention relates to a card accessing apparatus which employs a head to read or write data on a data storage area of a card, such as an optical card, magnetic card or the like, and more particularly, to an improved card accessing apparatus which prevents the head from vibrating during use.

BACKGROUND OF THE INVENTION

In a conventional card accessing apparatus, for example, for accessing optical cards, an optical card is placed on a stage which is supported by a pair of guide shafts which are parallel to each other. A stage feeding mechanism is connected to the stage, and an optical head is disposed above the stage and fixed to a supporting member which is mounted on a ceiling of a housing. The stage feeding mechanism includes a motor which rotates a first pulley which is mounted on an output shaft of the motor to drive the stage and optical card carried thereon. Power is transmitted from the first pulley to a driving pulley via a belt disposed therebetween. Power is further transmitted from the driving pulley to a driven pulley via a belt disposed therebetween. The stage is connected to the belt disposed between the driving and driven pulleys. When the motor rotates in reverse to reciprocate the stage, the optical card is reciprocated to a position under the optical head so that data can be read and written on the data storage area of the optical card.

In the conventional apparatus, however, the optical head is easily vibrated because the ceiling, to which the head is connected, vibrates readily. For example, the optical head vibrates excessively at starts and stops of the stage because the reaction against the starts and stops of the stage is transmitted to the optical head via the ceiling and the supporting member. Therefore, data is often misread or miswritten on the optical card because a light spot bombarded on the optical card deviates from the normal position. In addition, the data storage area collects dust because it faces upwardly. Also, the head has an objective lens which is used for card accessing and is held by a supporting member. However, the supporting member sags downwardly because of the weight of the lens, and the head moves downwardly. Accordingly, the conventional card accessing apparatus has the disadvantage that, the lens, in the above-described sagging condition, comes into contact with the data storage area, so that both the lens and the data storage area are often damaged.

SUMMARY OF THE INVENTION

It is, therefore, an object of this invention to provide a card accessing apparatus which reads and writes data with high precision on a data storage area of a card.

It is another object of this invention to provide a card accessing apparatus which prevents a data storage area of a card from collecting dust.

According to this invention, there is provided a card accessing apparatus which includes (1) a stage means for supporting a card such that a data storage area of the card faces downwardly, (2) a housing means including a bottom plate for housing the stage means, (3) a stage feeding means for reciprocating the stage means, (4) a head means for reading or writing data on the data storage area of the card, and (5) a head feeding means, mounted on the bottom plate, for feeding the head means to access the data storage area of the card. The head means is disposed under the stage means, and the stage feeding means is supported on the bottom plate of the housing.

BRIEF DESCRIPTION OF THE DRAWINGS

The above and other objects, advantages and features of the present invention will be more fully understood when considered in conjunction with the following figures, of which.

DETAILED DESCRIPTION OF THE INVENTION

Figure 1:
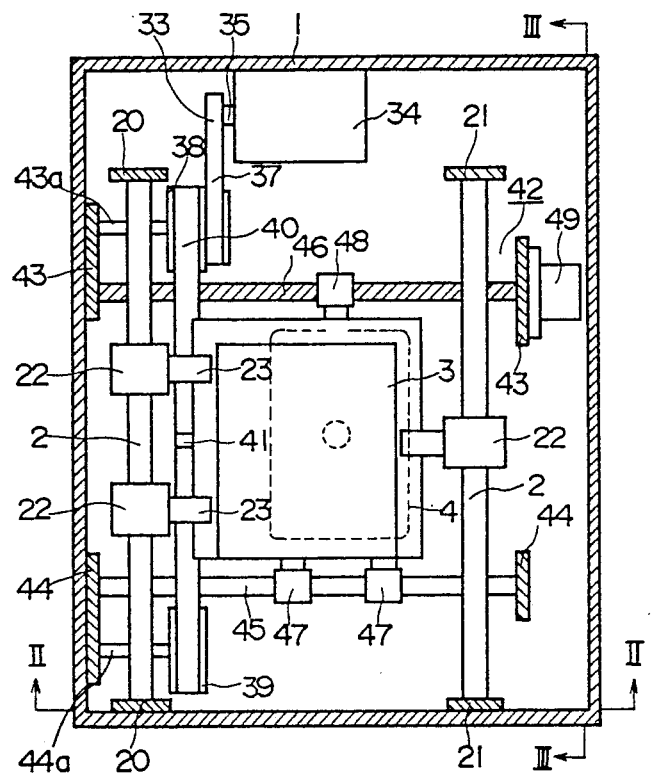
FIG. 1 is a partial sectional plan view of a preferred embodiment of the invention.
Figure 2:
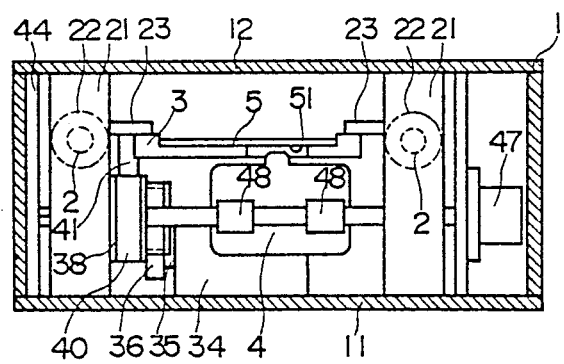
FIG. 2 is a sectional view taken along line II—II in FIG. 1.
Figure 3:
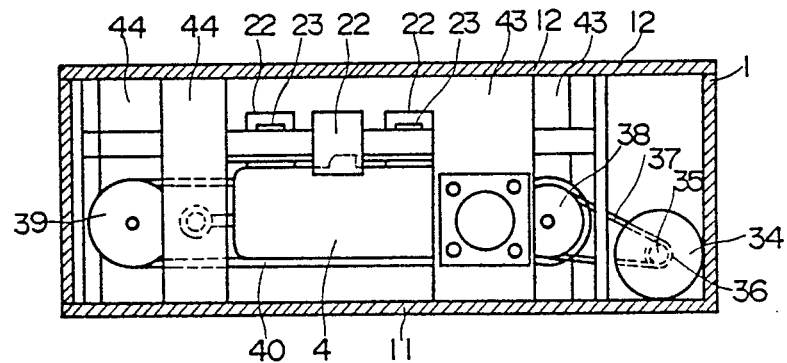
FIG. 3 is a sectional view taken along line III—III in FIG. 1.

FIGS. 1 to 3 show a card accessing apparatus according to a preferred embodiment of the invention. Two pairs of supporting walls 20 and 21 are arranged on a bottom plate 11 of a housing 1. A pair of guide shafts parallel to each other are mounted on walls 20 and 21 at the upper part of housing 1, respectively. Bearings 22 are slidably mounted on guide shafts 2 respectively, and a stage 3 is connected to bearings 22 via connecting members 23 fixed to bearings 22. Stage 3 holds a card 5 thereon and is reciprocated along guide shafts 2. A head 4 which reads or writes data on storage area 51 of card 5 is disposed under stage 3.

Figure 4:
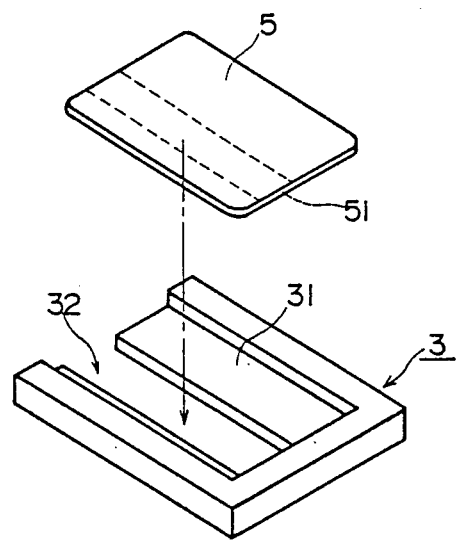
FIG. 4 is a perspective view of a stage before a card is fitted thereon.

As shown in FIG. 4, the upper portion of stage 3 is recessed to form a card holding portion 31 into which card 5 is fitted, and stage 3 has a slit-shaped window 32. When a card 5 is placed on card holding portion 31, data storage area 51 can be accessed by a head 4 through window 32. Since data storage area 51 faces downwardly, dust does not collect thereon.

A feeding mechanism 33 for reciprocating stage 3 includes a motor 34 with a first pulley 36 mounted on its output shaft 35. A driving pulley 38 is rotatably mounted on a shaft 43a fixed to a wall 43 which is described hereinafter. The output power of motor 34 is transmitted to driving pulley 38 via first pulley 36 mounted on output shaft 35 and a belt 37. A driven pulley 39 is rotatably mounted on a shaft 44a fixed to a wall 44 which is described hereinafter. Disposed between the driving and driven pulleys 38 and 39 is a belt 40 whose upper part is connected to the lower portion of stage 3 via a pin 41. Head 4 disposed under stage 3 is supported by a head feeder 42 for track accessing.

Feeder 42 has two pairs of supporting walls 43 and 44 arranged on bottom plate 11 of housing 1. Bottom plate 11 is not easily vibrated by the operation of feeding mechanism 33. Walls 43 and 44 are fixed to ceiling 12 and bottom plate 11 at both of their ends, respectively. A head guiding shaft 45 is disposed between walls 43. Head 4 is supported by shafts 45 and 46 via bearings 47 and a reed nut 48. A motor 49 is mounted on one of walls 43 and connected to threaded shaft 46. When motor 49 is driven to rotate threaded shaft 46 in alternate directions, head 4 moves to access the tracks of data storage area 51 of card 5.

The type of head 5 may be selected according to the particular information storage medium being used. For example, an optical head is used for optical cards, and a magnetic head for magnetic cards. In the FIGS. 1-4 embodiment, stage 3 has a window 32 for accessing head 4, but alternatively, card holding portion 31 or the entire stage 3 may be made of transparent materials.

When stage feeding mechanism 33 is operated, stage 3 shuttles along guide shaft 2 to move data storage area 51 with respect to head 4. Head 4 accesses storage area 51 to read or write data. During the reading or writing operation, head 4 is prevented from vibrating excessively because head feeder 42 supporting head 4 is arranged on bottom plate 11 which cannot be easily vibrated even if stage feeding mechanism 33 is operating. Therefore, with such vibrations eliminated, head 4 can precisely access storage area 51 to read and write data at high accuracy. In addition, an objective lens of head 4 does not make contact with storage area 51 because the lens is disposed under card 5 so that it is moved downwardly by gravitation away from card 5. Therefore, both the lens and storage area 51 are protected from damage from contacting each other.

Figure 5:
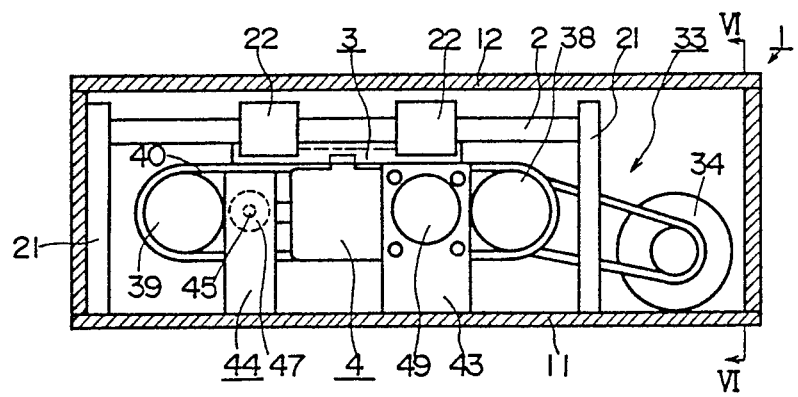
FIG. 5 is a longitudinal sectional view of a card accessing apparatus according to a second modified embodiment of the invention.
Figure 6:
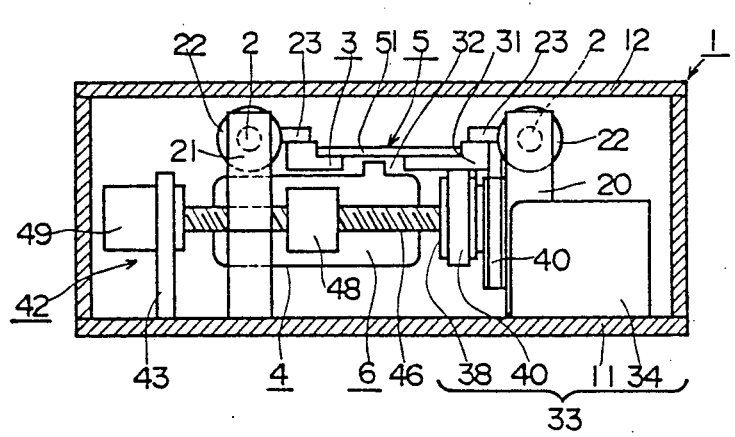
FIG. 6 is a sectional view taken along line VI—VI in FIG. 5.

FIGS. 5 and 6 show a card accessing apparatus according to another modified embodiment of the invention. As shown in FIGS. 5 and 6, supporting walls 20, 21, 43, and 44 are fixed to bottom plate 11 of housing 1 only at one of their ends. Otherwise, the construction and operation of the FIGS. 5 and 6 embodiment is the same as the embodiment of FIGS. 1 to 3.

Figure 7:
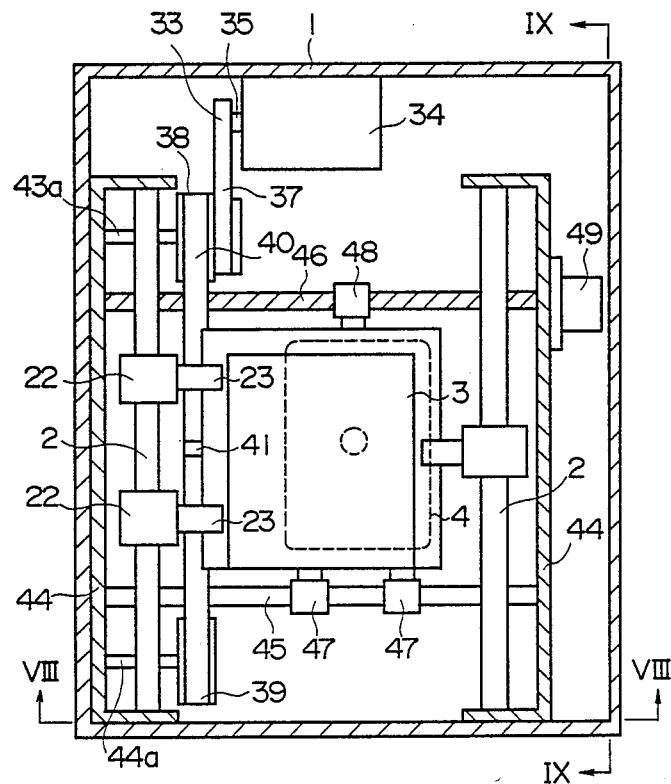
FIG. 7 is a partial sectional plan view of a third embodiment of the invention.
Figure 8:
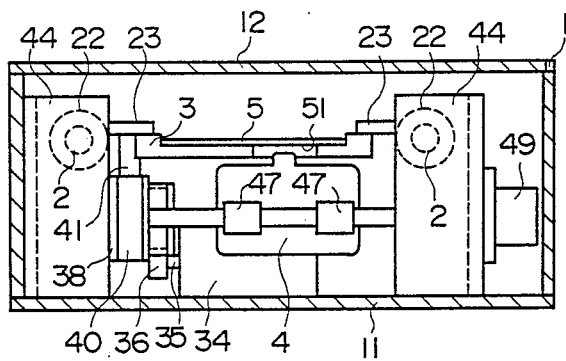
FIG. 8 is a sectional view taken along line VIII—VIII in FIG. 7.
Figure 9:
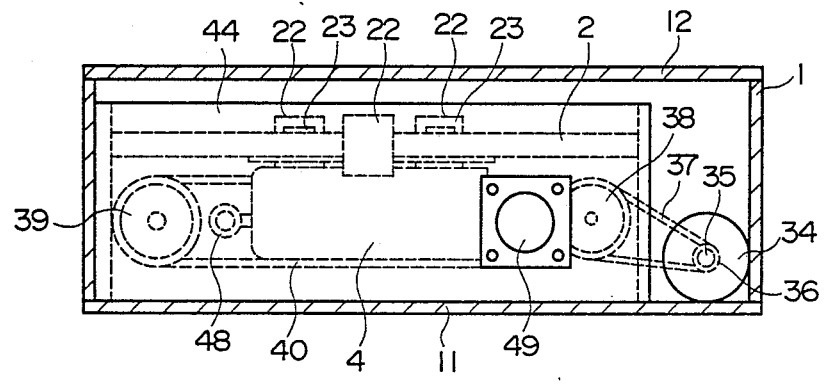
FIG. 9 is a sectional view taken along line IX—IX in FIG. 7.

FIGS. 7 to 9 show a card accessing apparatus according to a third embodiment of the invention. A pair of generally U-shaped supporting walls 44 is arranged on bottom plate 11 of housing 1. Two guide shafts 2, shafts 43a and 44a, shaft 45, and motor 49 are fixed to walls 44. Threaded shaft 46 is rotatably supported by walls 44.

Figure 10:
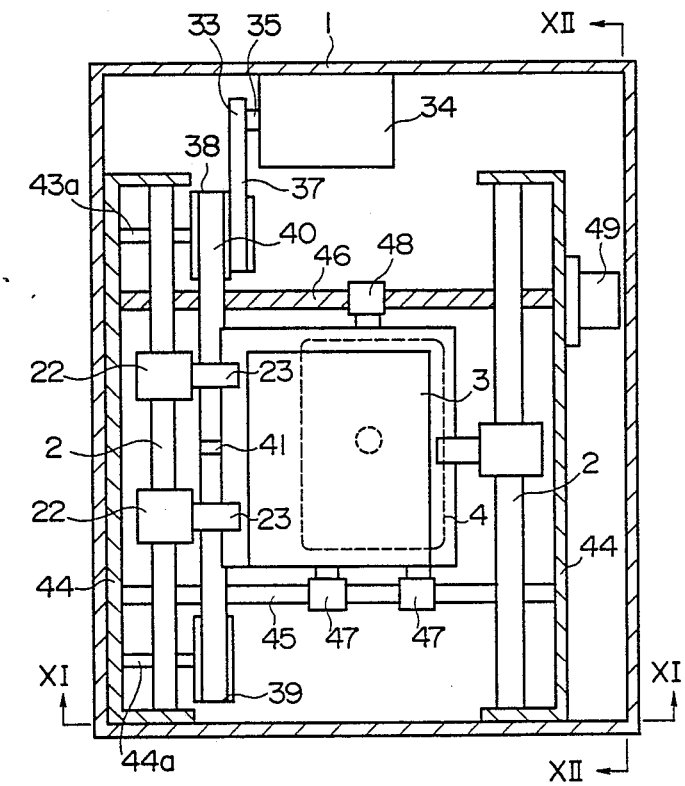
FIG. 10 is a partial sectional plan view of a fourth embodiment of the invention.
Figure 11:
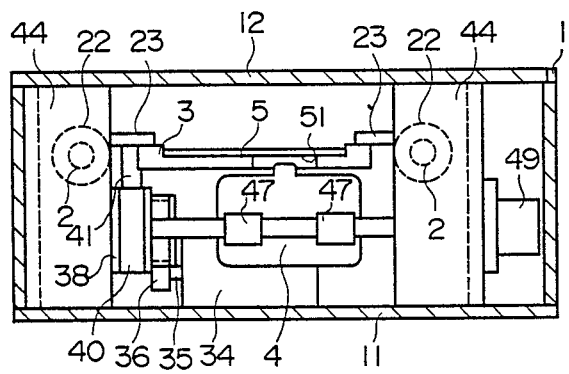
FIG. 11 is a sectional view taken along line XI—XI in FIG. 10.
Figure 12:
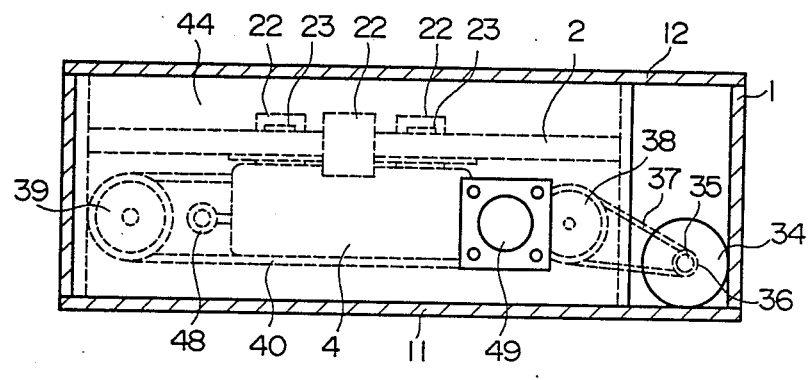
FIG. 12 is a sectional view taken along line XII—XII in FIG. 10.

FIGS. 10 to 12 show a card accessing apparatus according to a fourth embodiment of the invention. In this embodiment, a pair of walls 44 is fixed to ceiling 12 and bottom plate 11 at both ends thereof.

Figure 13:
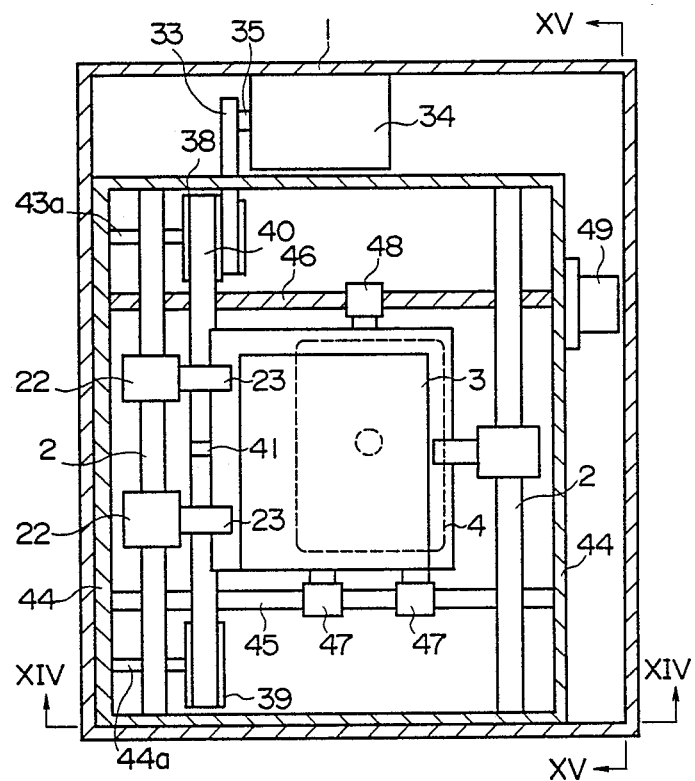
FIG. 13 is a partial sectional plan view of a fifth embodiment of the invention.
Figure 14:
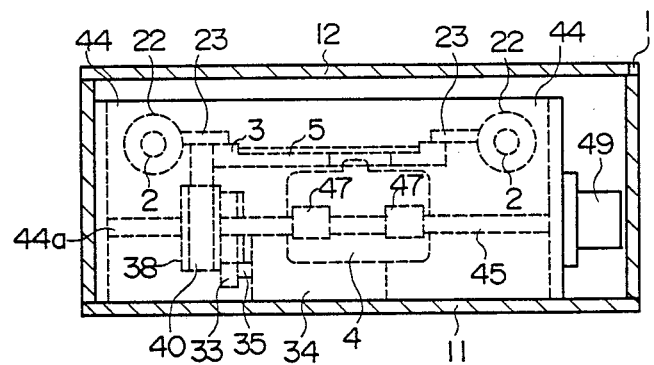
FIG. 14 is a sectional view taken along line XIV—XIV in FIG. 13.
Figure 15:
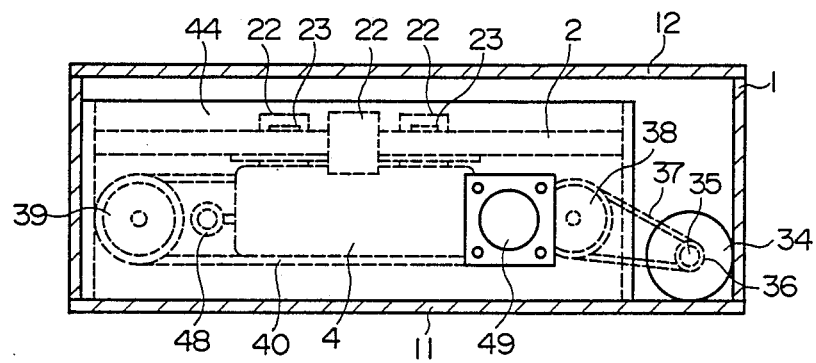
FIG. 15 is a sectional view taken along line XV—XV in FIG. 13.

FIGS. 13 to 15 show a card accessing apparatus according to a fifth embodiment of the invention. A box-shaped wall 44 is arranged on bottom plate 11 of housing 1. Two guide shafts 2, shafts 43a and 44a, guide shaft 45, and motor 49 are fixed to wall 44. Threads shaft 46 is rotatably supported by wall 44.

Figure 16:
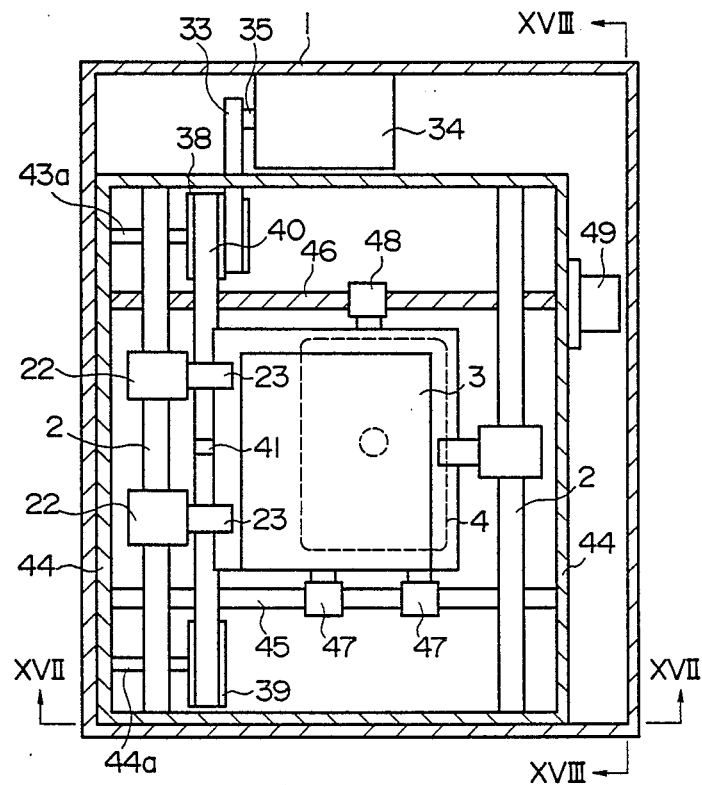
FIG. 16 is a partial sectional plan view of a sixth embodiment of the invention.
Figure 17:
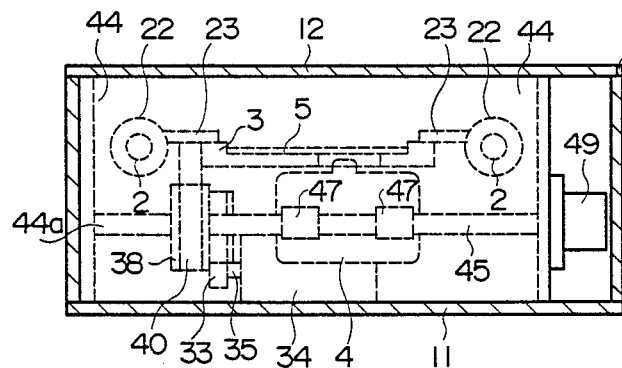
FIG. 17 is a sectional view taken along line XVII—XVII in FIG. 16.
Figure 18:
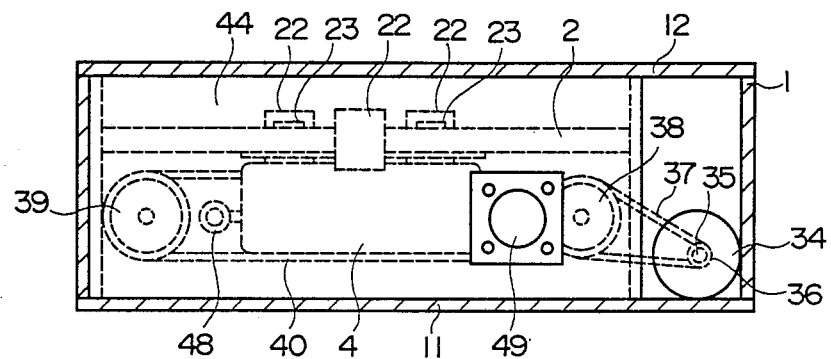
FIG. 18 is a sectional view taken along line XVIII—XVIII in FIG. 16.

FIGS. 16 to 18 show a card accessing apparatus according to a sixth embodiment of the invention. In this embodiment, a box-shaped wall 44 is fixed to ceiling 12 and bottom plate 11 at both ends thereof.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

I claim:

1. A card accessing apparatus, comprising:
   stage means for supporting a data storage card with a data storage area of said card facing downwardly;
   housing means including a bottom plate, for housing said stage means;
   stage feeding means supported on said bottom plate, for reciprocating said stage means;
   head means disposed under said stage means, for reading and writing data on said data storage area of said card;
   head feeding means supported on said bottom plate, for driving said head means to a position under said stage means to access said data storage area of said card;
   a first wall member supporting said stage feeding means, said first well member being connected to said bottom plate of said housing means;
   a second wall member supporting said head feeding means, said second wall member being connected to said bottom plate of said housing means.

2. A card accessing apparatus, comprising:
   stage means for supporting a data storage card with a data storage area of said card facing downwardly;
   housing means including a bottom plate, for housing said stage means;
   stage feeding means supported on said bottom plate, and including a first motor for reciprocating said stage means;
   head means disposed under stage means, for reading and writing data on said at storage area of said card;
   head feeding means supported on said bottom plate, and including a second motor for driving said head means to a position under said stage to access said data storage area of said card.

3. The apparatus as in claim 2, wherein said stage means includes an upper portion having a recess forming a card holding portion.

4. The apparatus as in claim 3, wherein said card holding portion is made of transparent material.

5. The apparatus as in claim 2, wherein said stage means has a window through which said data storage area is accessed by said head means.

6. The apparatus as in claim 2, wherein said stage means is made of transparent material.

7. A card accessing apparatus, comprising:
stage means for supporting a data storage card with a data storage area of said card facing downwardly;
housing means including a bottom plate, for housing said stage means;
stage feeding means supported on said bottom plate, for reciprocating said stage means;
head means disposed under said stage means, for reading and writing data on said data storage area of said card;
head feeding means supported on said bottom plate, for driving said head means to a position under said stage means to access said data storage area of said card;
a pair of generally U-shaped wall members for supporting said stage feeding means, said pair of generally U-shaped wall members being connected to said bottom plate of said housing means.

8. A card accessing apparatus, comprising:
stage means for supporting a data storage card with a data storage area of said card facing downwardly;
housing means including a bottom plate, for housing said stage means;
stage feeding means supported on said bottom plate, for reciprocating said stage means;
head means disposed under said stage means, for reading and writing data on said data storage area of said card;
head feeding means supported on said bottom plate, for driving said head means to a position under said stage means to access said data storage area of said card;
a pair of generally U-shaped wall members for supporting said stage feeding means and said head feeding means, said pair of generally U-shaped wall members being connected to said bottom plate and a ceiling portion of said housing means.

9. A card accessing apparatus, comprising:
stage means for supporting a data storage card with a data storage area of said card facing downwardly;
housing means including a bottom plate, for housing said stage means;
stage feeding means supported on said bottom plate, for reciprocating said stage means;
head means disposed under said stage means, for reading and writing data on said data storage area of said card;
head feeding means supported on said bottom plate, for driving said head means to a position under said stage means to access said data storage area of said card;
a box-shaped wall member for supporting said stage feeding means and said head feeding means, said box-shaped wall member being connected to said bottom plate of said housing means.

10. A card accessing apparatus, comprising:
stage means for supporting a data storage card with a data storage area of said card facing downwardly;
housing means including a bottom plate, for housing said stage means;
stage feeding means supported on said bottom plate, for reciprocating said stage means;
head means disposed under said stage means, for reading and writing data on said data storage area of said card;
head feeding means supported on said bottom plate, for driving said head means to a position under said stage means to access said data storage area of said card; and
a box-shaped wall member for supporting said stage feeding means and said head feeding means, said box-shaped wall member being connected to said bottom plate and a ceiling portion of said housing means.

11. A card accessing apparatus, comprising:
stage means for supporting a data storage card with a data storage area of said card facing downwardly;
housing means including a bottom plate, for housing said stage means;
stage feeding means supported on said bottom plate, for reciprocating said stage means;
head means disposed under stage means, for reading and writing data on said data storage area of said card;
head feeding means supported on said bottom plate, for driving said head means to a position under said stage means to access said data storage area of said card;
a first wall member supporting said stage feeding means said first wall member being connected to said bottom plate and a ceiling portion of said housing means; and,
a second wall member supporting said head feeding means said second wall member being connected to said ceiling portion and said bottom plate of said housing means.

* * * * *